United States Patent
Hida

(10) Patent No.: US 12,100,199 B2
(45) Date of Patent: Sep. 24, 2024

(54) APPARATUS, PROGRAM, AND METHOD FOR ANOMALY DETECTION AND CLASSIFICATION

(71) Applicant: FUJITSU LIMITED, Kawasaki (JP)

(72) Inventor: Yusuke Hida, London (GB)

(73) Assignee: FUJITSU LIMITED, Kawasaki (JP)

( * ) Notice: Subject to any disclaimer, the term of this patent is extended or adjusted under 35 U.S.C. 154(b) by 232 days.

(21) Appl. No.: 17/548,200

(22) Filed: Dec. 10, 2021

(65) Prior Publication Data

US 2022/0262108 A1 Aug. 18, 2022

(30) Foreign Application Priority Data

Jan. 12, 2021 (EP) ..................... 21151153

(51) Int. Cl.
*G06V 10/98* (2022.01)
*G06N 3/045* (2023.01)
(Continued)

(52) U.S. Cl.
CPC ............. *G06V 10/98* (2022.01); *G06N 3/045* (2023.01); *G06N 3/088* (2013.01); *G06V 10/764* (2022.01); *G06V 10/774* (2022.01); *G06V 10/82* (2022.01)

(58) Field of Classification Search
None
See application file for complete search history.

(56) References Cited

U.S. PATENT DOCUMENTS

| | | | |
|---|---|---|---|
| 2018/0039555 A1 | 2/2018 | Salunke et al. | |
| 2018/0227482 A1* | 8/2018 | Holzer ................... | G06V 20/10 |

(Continued)

FOREIGN PATENT DOCUMENTS

| | | |
|---|---|---|
| EP | 3739513 A1 | 11/2020 |
| WO | WO 2018/063701 A1 | 4/2018 |

OTHER PUBLICATIONS

An Anomaly Feature-Editing-Based Adversarial Network. Yang et al. (Year: 2020).*

(Continued)

*Primary Examiner* — Delomia L Gilliard
(74) *Attorney, Agent, or Firm* — STAAS & HALSEY LLP

(57) ABSTRACT

A computing apparatus to classify anomalies in images, by unsupervised anomaly detection on an input dataset of the images to detect anomaly portions from said images to generate, for an image in the dataset, a corresponding mask image transmitting a detected anomaly portion in the image and blocking anomaly-free portions; train a classifier ANN, including, in a first epoch process processing a masked version of the input dataset with the classifier ANN, the masked version including the image of the input dataset masked by the corresponding mask image, and training the classifier ANN to classify anomaly portions into one of plural classes by minimising a cross entropy loss function using generated labels as ground truths; extracting, from the classifier ANN, a latent feature representation of the image of the masked version in the input dataset; and in a second epoch process generating a set of pseudo labels corresponding to the masked version of the input dataset by applying an unsupervised clustering algorithm to the latent feature representations to cluster the latent feature representations into one of plural clusters each with a different associated pseudo label, to obtain a pseudo label corresponding to the image in the input dataset; training the classifier ANN to minimise a loss function between a class into which the image of the input dataset is classified by the classifier ANN using the pseudo label for said image as ground truth The training epoch may be repeatedly executed until satisfaction of a training condition, and to output, for the image in the input dataset, an identification of the detected anomaly portion (Continued)

with a corresponding class into which the anomaly portion is classified by the classifier ANN.

20 Claims, 15 Drawing Sheets
(8 of 15 Drawing Sheet(s) Filed in Color)

(51) Int. Cl.
    *G06N 3/088*     (2023.01)
    *G06V 10/764*     (2022.01)
    *G06V 10/774*     (2022.01)
    *G06V 10/82*     (2022.01)

(56) References Cited

U.S. PATENT DOCUMENTS

| | | | |
|---|---|---|---|
| 2018/0268142 A1 | 9/2018 | Sethumadhavan et al. | |
| 2019/0096056 A1* | 3/2019 | Giering | G06V 10/764 |
| 2019/0251349 A1* | 8/2019 | Duerksen | G07D 7/00 |
| 2020/0364842 A1* | 11/2020 | Chaton | G06T 7/001 |
| 2023/0281959 A1* | 9/2023 | Hoshen | G06N 3/045 |
| | | | 382/225 |

OTHER PUBLICATIONS

Deep Clustering for Unsupervised Learning of Visual Features. Caron et al. (Year: 2019).*
Paul Bergmann et al.; "A Comprehensive Real-World Dataset for Unsupervised Anomaly Detection"; MVTec Software GmbH; http://arxiv.org/pdf/1807.06653.pdf; (9 pages).
Chong Zhou et al.; "*Anomaly Detection with Robust Deep Autoencoders*; KDD '17: Proceedings of the 23$^{rd}$ ACM SIGKDD International Conference on Knowledge Discovery and Data Mining"; Aug. 4, 2017; http://arxiv.org/pdf/1807.05520.pdf; pp. 665-674; (5 pages).
Zhixuan Zhao, Bo Li, Rong Dong, and Peng Zhao; "*A Surface Defect Detection Method Based on Positive Samples*"; Pacific Rim International Conference on Artificial Intelligence, Springer International Publishing, 2018; pp. 473-481; (9 pages).
Kyosuke Komoto et al.; "A performance evaluation of defect detection by using denoising autoencoder generative adversarial networks"; In IWAIT, pp. 1-4. IEEE, 2018; (4 pages).
Thomas Schlegl et al.; "Unsupervised anomaly detection with generative adversarial networks to guide marker discovery"; In International Conference on IPMI, pp. 146-157. Springer, 2017; (12 pages).
Asako Kanezaki et al.; "Unsupervised Image Segmentation by Backpropagation"; National Institute of Advanced Industrial Science and Technology (AIST); https://kanezaki.github.io/pytorch-unsupervised- segmentation/ICASSP2018_kanezaki.pdf; (5 pages).
Aditya Chattopadhyay et al.; "Improved Visual Explanations for Deep Convolutional Networks"; arXiv:1710.11063v3 [cs.CV]; Nov. 9, 2018; (17 pages).
Mathilde Caron et al.; "Deep Clustering for Unsupervised Learning of Visual Features"; arXiv:1807.05520v2 [cs.CV] Mar. 18, 2019; https://arxiv.org/pdf/1807.05520.pdf ; (30 pages).
Guansong Pang et al.; "Deep Learning for Anomaly Detection: A Review"; arXiv:2007.02500v3 [cs.LG] Dec. 5, 2020; ACM Comput. Surv., vol. 1, No. 1, Article 1, publication date: Jan. 2020; (36 pages).
Xu Ji et al.; "Invariant Information Clustering for Unsupervised Image Classification and Segmentation"; arXiv:1807.06653v4 [cs.CV]; Aug. 22, 2019; https://arxiv.org/pdf/1807.06653.pdf ; (10 pages).
Yang Hua et al: "An Anomaly Feature-Editing-Based Adversarial Network for Texture Defect Visual Inspection", IEEE Transactions on Industrial Informatics, IEEE Service Center, New York, NY, US, vol. 17, No. 3, Aug. 11, 2020 (Aug. 11, 2020), pp. 2220-2230, XP011825214, [retrieved on Dec. 3, 2020]; (11 pages).
Extended European Search Report dated Sep. 7, 2021 in corresponding European Patent Application No. 21151153.0 (13 pages).
Chong Zhou et al.; "KDD '17: Proceedings of the 23$^{rd}$ ACM SIGKDD International Conference on Knowledge Discovery and Data Mining"; Aug. 4, 2017; http://arxiv.org/pdf/1807.05520.pdf; pp. 665-674; (5 pages).
Zhixuan Zhao et al.; "Anomaly detection with robust deep autoencoders"; In Proceedings of the 23rd ACM SIGKDD International Conference on Knowledge Discovery and Data Mining, pp. 665-674. ACM, 2017; (5 pages).

\* cited by examiner

| NMI | PCA& UC | TL | Deep Cluster | This IP |
|---|---|---|---|---|
| Bottle | 0.17 | 0.49 | 0.32 | 0.59 |
| Cable | 0.24 | 0.29 | 0.22 | 0.67 |
| Capsule | 0.18 | 0.17 | 0.16 | 0.48 |
| Carpet | 0.14 | 0.26 | 0.18 | 0.67 |
| Grid | 0.28 | 0.23 | 0.19 | 0.61 |
| Hazelnut | 0.16 | 0.29 | 0.38 | 0.76 |
| Leather | 0.43 | 0.38 | 0.20 | 0.5 |
| Metal-nut | 0.14 | 0.45 | 0.29 | 0.67 |
| Pill | 0.18 | 0.21 | 0.13 | 0.42 |
| Screw | 0.15 | 0.12 | 0.06 | 0.55 |
| Tile | 0.14 | 0.37 | 0.27 | 0.78 |
| Toothbrush | 0.06 | 0.19 | 0.17 | 0.85 |
| Transistor | 0.23 | 0.31 | 0.18 | 0.88 |
| Wood | 0.15 | 0.32 | 0.27 | 0.55 |
| Zipper | 0.10 | 0.22 | 0.11 | 0.59 |
| AVERAGE | 0.18 | 0.29 | 0.21 | 0.64 |

FIGURE 12

APPARATUS, PROGRAM, AND METHOD FOR ANOMALY DETECTION AND CLASSIFICATION

CROSS-REFERENCE TO RELATED APPLICATIONS

This application is based on and hereby claims priority under 35 USC 119 to European Patent Application No. 21151153.0, filed on Jan. 12, 2021, in the European Patent Office, the entire contents of which is incorporated herein by reference.

FIELD

This application is in the field of quality control in production environments and specifically relates to the automated identification and labelling of anomalies in images.

BACKGROUND

Anomaly detection is a topic of interest and research as it is beneficial to a range of sectors, such as manufacturing and medicine. However, it is difficult to acquire anomalous data from real-world applications due to defects being extremely rare, so that unsupervised methods of anomaly detection are of particular interest (i.e. because of the difficulty of obtaining good quality training data for supervised methods). Present methods for unsupervised anomaly detection via artificial neural networks, ANNs, detect only the position of anomaly from an image. This means they identify only good or non-good for every pixel in an image, and could not recognize the sort of defects such as clack, scratch, and bend. Although semantic segmentation can segment objects which are obviously different, it is difficult to separate defect regions from defect-free regions because anomalies are often complex and similar with defect-free regions in terms of shape and colour. At production environments, those causes and reasons of anomalies are investigated and they improve the product by feedback to other processes. Therefore, identifying and classifying anomalies properly is an important element in improving quality of products and processes.

Manufacturing companies are constrained under very strict norms. In order to provide the highest quality possible while producing always more complex components, manufacturers have to control their own products efficiently. To do so, non-destructive testing (NDT) has been used intensively. It is an analysis technique used in science to evaluate the properties of a product, component or system without causing damage. However, in an automatized production lane environment, the inspection process is a bottleneck. Manufacturers capture a large amount of data from the products, but they are not labelled. Therefore, it is hard to automate the inspection process. Although general unsupervised technologies can work using only stored data without labelling, existing methods have not been able to provide labelling of anomalies (what type of anomalies). This information is useful at the practical manufacturing site, because they improve the quality of products, processes, and human education day to day. Embodiments address the shortcomings of existing technologies by providing an unsupervised technique that enables detection of anomaly position and classification of anomalies.

SUMMARY

Embodiments include a computing apparatus configured to identify and classify anomalies in images, the computing apparatus comprising memory hardware and processor hardware, the memory hardware storing a classifier artificial neural network, ANN, and processing instructions, the processor hardware being configured to execute the processing instructions which, when executed, cause the computing apparatus to: perform unsupervised anomaly detection on an input dataset of images to detect anomaly portions from said images to generate, for each image in the dataset, a corresponding mask image transmitting any detected anomaly portion or anomaly portions in the image and blocking anomaly-free portions; train the classifier ANN, including, in each training epoch: in a first process: processing a masked version of the input dataset with the classifier ANN, the masked version comprising each image of the input dataset masked by the corresponding mask image, and training the classifier ANN to classify anomaly portions into one of plural classes by minimising a cross entropy loss function using automatically generated labels as ground truths; extracting, from the classifier ANN, a latent feature representation of each of image of the masked version of the input dataset; in a second process: generating a set of pseudo labels corresponding to the masked version of the input dataset by applying an unsupervised clustering algorithm to the latent feature representations to cluster each of the latent feature representations into one of plural clusters each with a different associated pseudo label, to obtain a pseudo label corresponding to each image of the input dataset; training the classifier ANN to minimise a loss function between a class into which each image of the input dataset is classified by the classifier ANN using the pseudo label for said image as ground truth; the computing apparatus being caused to execute the training epoch repeatedly until satisfaction of a training condition, and to output, for each image of the input dataset, an identification of each detected anomaly portion with a corresponding class into which the anomaly portion is classified by the classifier ANN.

Embodiments perform unsupervised semantic segmentation for anomaly detection from input images. Embodiments embody several functions including an anomaly position detector and a feature extractor. Embodiments extract knowledge from input images and can identify types of potential defects without requiring training with images of defects.

Material manufacturing companies are constrained under very strict standards. In order to provide the highest quality materials possible while producing always more complex components, manufacturers have to control their own products efficiently. To do so, non-destructive testing (NDT) has been used. NDT covers a wide group of analysis techniques used in science and technology industry to evaluate the properties of a material, component or system without causing damage. However, in an automatized production lane, inspection processes are the bottleneck, and hence increase production costs.

Manufacturers capture a large amount of data by imaging the products, but as they are not labelled, human input is required in the inspection process.

Existing techniques for automating material surface inspection can be categorized in two ways:
  Firstly, to create a large dataset of human labelled images, which is extremely laborious, and is limited by the expertise of the annotator.
  Secondly, create a hand crafted algorithm. This technique applies computer vision methods over an unlabelled dataset and evaluating an algorithm over a small labelled dataset. Such techniques suffer from the difficulty in engineering an effective algorithm.

Embodiments address an issue that previous approaches to anomaly detection via neural network do not focus on the position of the anomaly, and therefore may detect position of the anomaly but do not classify anomalies. A network theoretically looks at a whole image using convolution layers and pooling etc, to classify/segment objects which have different features identifiable by the network by their colours and shapes. Therefore, a general network cannot classify/segment similar features. For instance, an anomaly may be the middle bent metal object as shown in FIG. 6, in which the left hand image shows a defect free product, and the right hand image shows a product with a defective middle metal connector. If its anomaly was unknown without ground truth or knowledge, a prior art network would not be able to recognize these differences (because bent metal is not, in itself, a defect—it is the location/position in which the bent metal occurs that renders it defective). In the example of the transistor of FIG. 6, a prior art network can recognize the background and transistor. A prior art network cannot, however, classify them with good/anomaly because both images have the features of bent metal. Embodiments use masks generated in a first anomaly detection step to train the classifier artificial neural network look at the parts of image at which anomalies occur. In other words, embodiments look at only anomaly part in an image using anomaly position information obtained from existing unsupervised anomaly detection. Consequently, the classifier artificial neural network can classify images with pixel-wise analysis such as segmentation.

Embodiments provide an unsupervised semantic segmentation method for anomaly detection which can identify an anomaly's position and type without labelled training data.

Deep learning is recognised for its ability to outperform traditional methods with large labelled datasets. Embodiments leverage unsupervised deep learning to achieve anomaly detection and classification. Anomaly detection and automatic inspection lend themselves to unsupervised deep learning technologies because the alternative, i.e. labelling large datasets, is very costly and time-consuming.

As a state of the art, using autoencoder/GAN is a popular method. Such approaches remove the defects from an anomalous image by training only defect-free data. However, these methods can only detect the position of the anomalies, not kinds of anomaly. They do not have the ability to classify the anomalies into types. On the other hand, general clustering algorithms can classify types of anomaly, but they do not detect anomaly positions on an image. Thus, the technical task is semantic segmentation for anomaly detection that can recognize both types and positions of anomaly. Generic semantic segmentation focuses detecting segments of objects. Prior art AI semantic segmentation algorithms recognize the objects or segment with colour and shapes. Utility is limited to anomalies that are easy to detect with colour, but prior art algorithms are ineffective in scenarios in which anomalies have similar colour and shape to the background. Embodiments are effective in segmenting to identify not only anomaly position, but also to make clusters of anomalies such as semantic segmentation, as highlighted in FIG. 13.

An issue when using deep learning for semantic segmentation is where on an image a neural network looks when detecting anomalies. A prior art (supervised) neural network extracts features in the training phase with a large dataset. Through supervised learning, the neural network can learn the features of anomalies. However, with unsupervised learning the neural network is not pointed to the anomalies in the same way. Where a neural network looks, in other words the locations on the image of the pixels that feed into the output of the neural network, can be illustrated by analysis tools such as Grad-CAM++. FIG. 14 illustrates that in existing unsupervised techniques the neural network is taking inputs from all over the image rather than focusing on the anomaly. There are two type as the input data to support unsupervised learning for anomaly position. An input is a raw image which has both defect-free regions and anomaly-regions. The other is a masked image of only anomaly position. Existing unsupervised learning looks at a wide area around the anomaly although supervised learning looks specifically at the anomaly like groundtruth (gf). Embodiments enable unsupervised machine learning techniques to classify anomalies properly by classifying based on pixels local to the anomaly.

According to embodiments, the masked version of the input dataset processed by the classifier ANN in the first process, in addition to being masked by the corresponding mask, may be filtered by an image filter or transformed by an image transform algorithm.

Advantageously, the transformed versions of the masked versions of the input dataset provide additional images with which to train the classifier ANN in the first process. Furthermore, the transformed versions may emphasise properties of anomalies.

Optionally, the automatically generated labels are determined by the image transform algorithm or image filter applied to the version, so that each image transform algorithm or image filter maps to a label, the label values being arbitrary values different from one another. The first process effectively teaches the classifier ANN to look at the relevant portions of the images by the application of the mask. So the labelling is to provide a basis against which to classify the images, but the key functional aspect is the masking which serves to condition the ANN 210 to "look at" (i.e. apply higher weightings to parameters based on values from) image regions where anomalies occur.

Optionally, the image filter is an emboss image filter or the image transform algorithm is an embossing image transform algorithm.

Embossing is particularly advantageous because it emphasises anomalies having depth, in which variation in pixel value (i.e. colour) may otherwise be difficult to detect.

Optionally, the masked version of the input dataset comprises plural versions of each member of the input dataset, the plural versions being the image with each of a selection of plural image transform algorithm or image filters applied.

In this case, the plural versions provide additional content with which to train the classifier ANN in the first process, and there may be certain anomalies that are more or less apparent to the classifier ANN when subject to particular transforms.

Optionally, the unsupervised anomaly detection is performed with an autoencoder or a generator neural network, pre-trained to generate defect-free portions of images, and to generate a mask image corresponding to an image from the input dataset by generating a defect-free version of said image, and comparing said image with the generated defect-free version to obtain the mask. Optionally, the generator neural network is a generative adversarial neural network.

Autoencoders and GANs configured in this way provide an efficient and accurate mechanism with which to perform unsupervised anomaly detection. Furthermore the pre-training requires defect-free images, which are easy to obtain, and is not reliant on defect images, which are difficult to obtain.

Optionally, the loss function in the first process is a pixel-wise cross entropy loss. Other cross-entropy loss functions may be utilised. The loss function may be cross-entropy loss. The loss function may be binary cross-entropy loss, derivative cross-entropy loss, sigmoid cross-entropy loss, or categorical cross-entropy loss.

Optionally, each training epoch further includes: in a third process: generating, as a modified masked input dataset, a modified version of each image of the masked version of the input dataset, by adding noise data to the respective image of the masked version of the input dataset (and by applying a transform or filter), training the classifier ANN to maximise mutual information as a loss function, based on the classifier ANN processing input dataset A, being the masked input dataset, and the classifier ANN processing input dataset B, being the modified masked input dataset.

Advantageously, combining the three processes enables the aggregate loss of the three processes to be used in training the classifier ANN, so that in each training epoch the classifier ANN is taught where to look, and how to classify.

In summary, there are three losses, and they may be summed to train the classifier ANN.

Total_loss=$a$*Loss1+$b$*Loss2+$c$*Loss3.

Loss1 of cross-entropy for first process
Loss2 of cross-entropy for second process
Loss3 of mutual information for third process
Loss1 needs the ground truth we created with transformation of input data. They are images and labels.
Loss2 requires the pseudo label as the ground truth comparing with (raw*mask).
Loss3 compares the (raw*mask) with (raw*mask*affine+noise) by mutual information.

Embodiments of another aspect include a system, comprising a computing apparatus embodiment, and imaging apparatus configured to generate images and to store the generated images as an input dataset for processing by the computing apparatus.

Optionally, the images are images of production samples and the system may further comprise a production environment for producing products or materials as production samples.

Embodiments of another aspect include a method of identifying and classifying anomalies in images, the method comprising: performing unsupervised anomaly detection on an input dataset of images to detect anomaly portions from said images to generate, for each image in the dataset, a corresponding mask image transmitting any detected anomaly portion or anomaly portions in the image and blocking anomaly-free portions; training a classifier ANN, including, in each training epoch: in a first process: processing a masked version of the input dataset with the classifier ANN, the masked version comprising each image of the input dataset masked by the corresponding mask image, and training the classifier ANN to classify anomaly portions into one of plural classes by minimising a cross entropy loss function using automatically generated labels as ground truths; extracting, from the classifier ANN, a latent feature representation of each of image of the masked version of the input dataset; in a second process: generating a set of pseudo labels corresponding to the masked version of the input dataset by applying an unsupervised clustering algorithm to the latent feature representations to cluster each of the latent feature representations into one of plural clusters each with a different associated pseudo label, to obtain a pseudo label corresponding to each image of the input dataset; training the classifier ANN to minimise a loss function between a class into which each image of the input dataset is classified by the classifier ANN using the pseudo label for said image as ground truth; the method comprising executing the training epoch repeatedly until satisfaction of a training condition, and outputting, for each image of the input dataset, an identification of each detected anomaly portion with a corresponding class into which the anomaly portion is classified by the classifier ANN.

Embodiments of another aspect include a computer program which, when executed by a computing apparatus having processor hardware and memory hardware, causes the computing apparatus to perform a method embodiment as detailed above or elsewhere in this document.

Optionally, the computer program is stored on a non-transitory computer storage medium.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments are described with reference to the accompanying drawings, in which:

FIG. 12 is a table of outcomes in implementations with 15 different input datasets compared with prior art methods;

DETAILED DESCRIPTION

Figure 1:
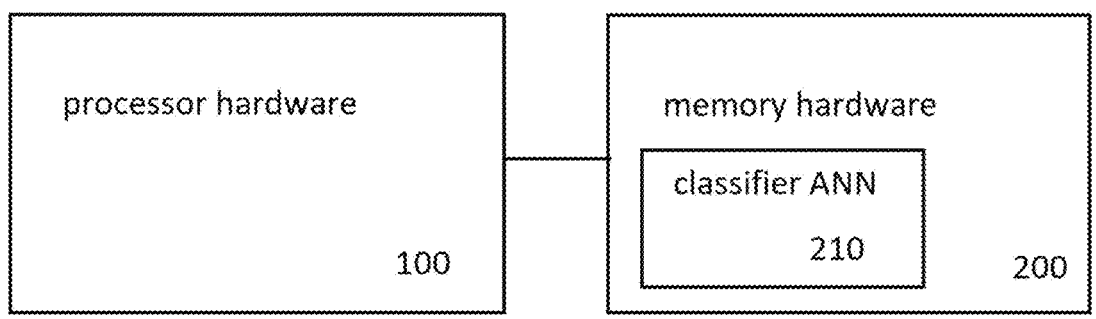
FIG. 1 illustrates a hardware architecture of an embodiment.

FIG. 1 is a schematic illustration of a hardware arrangement of an embodiment. The hardware comprises processor hardware 100 and memory hardware 200. The storage of the classifier ANN 210 on the memory hardware is illustrated. It is noted that the processor hardware 100 and memory hardware 200 may be located in a production environment, for example, as part of a quality control mechanism. Alternatively, the processor hardware 100 and memory hardware 200 may be remote from the production environment, but provided with images of production samples from the production environment as the input dataset.

The processor hardware 100 and memory hardware 200 may be components of a computer system. The processor hardware may be one or a plurality of interconnected CPUs. The memory hardware 200 may comprise volatile memory, non-volatile memory, or a combination of volatile and non-volatile memory. The memory hardware 200 stores processing instructions for execution by the processor hardware 100. In addition, the memory hardware 200 may store datasets while steps or processes such as those illustrated in FIGS. 2 and 3 are being executed by the processor hardware 100 in collaboration with the memory hardware 200.

The classifier ANN 210 is an artificial neural network for classification of images. An example of such an ANN is AlexNet. Processes of embodiments train and implement the classifier ANN 210. The classifier ANN 210 may be a deep neural network DNN.

Figure 2:
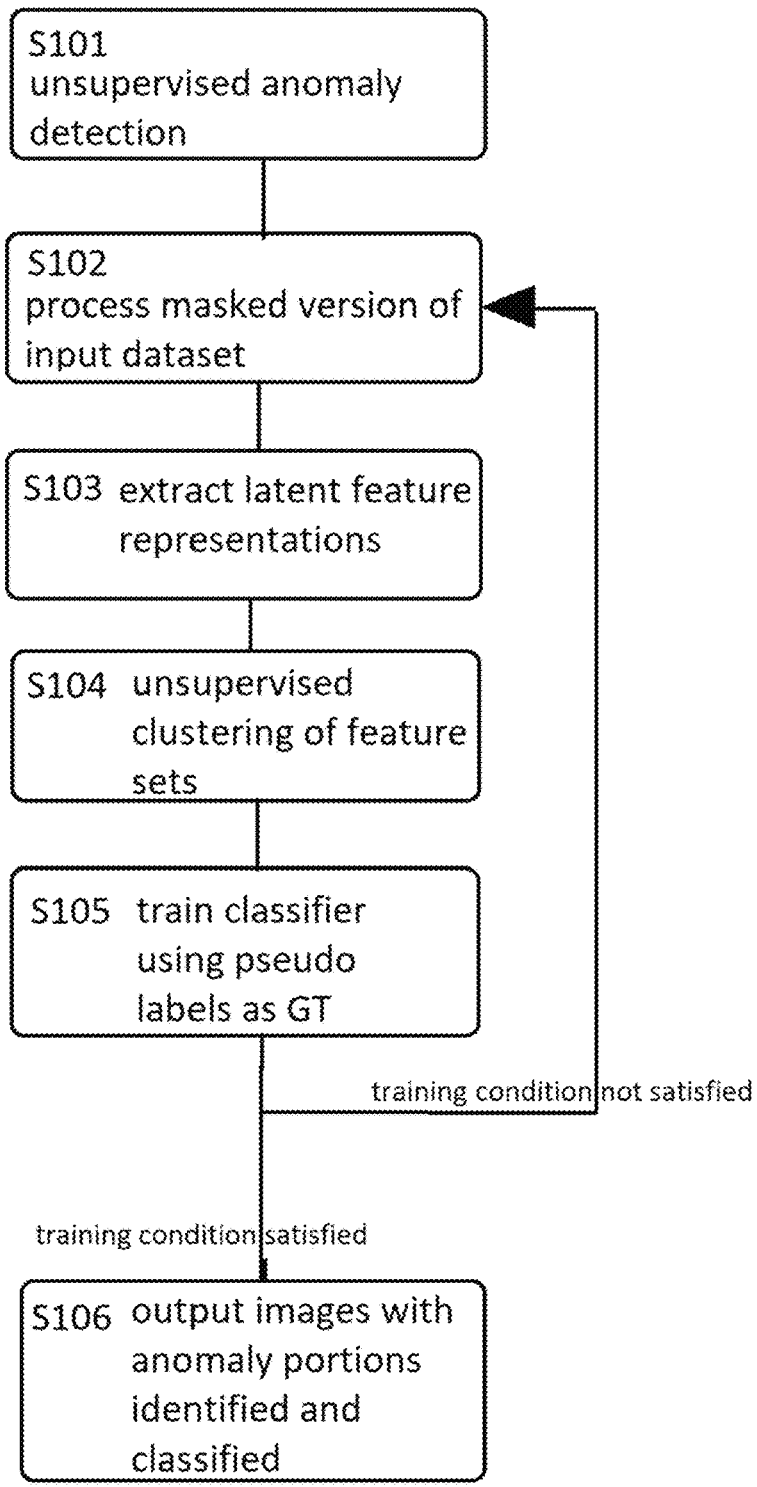
FIG. 2 illustrates a processing flow in embodiments.
Figure 3:
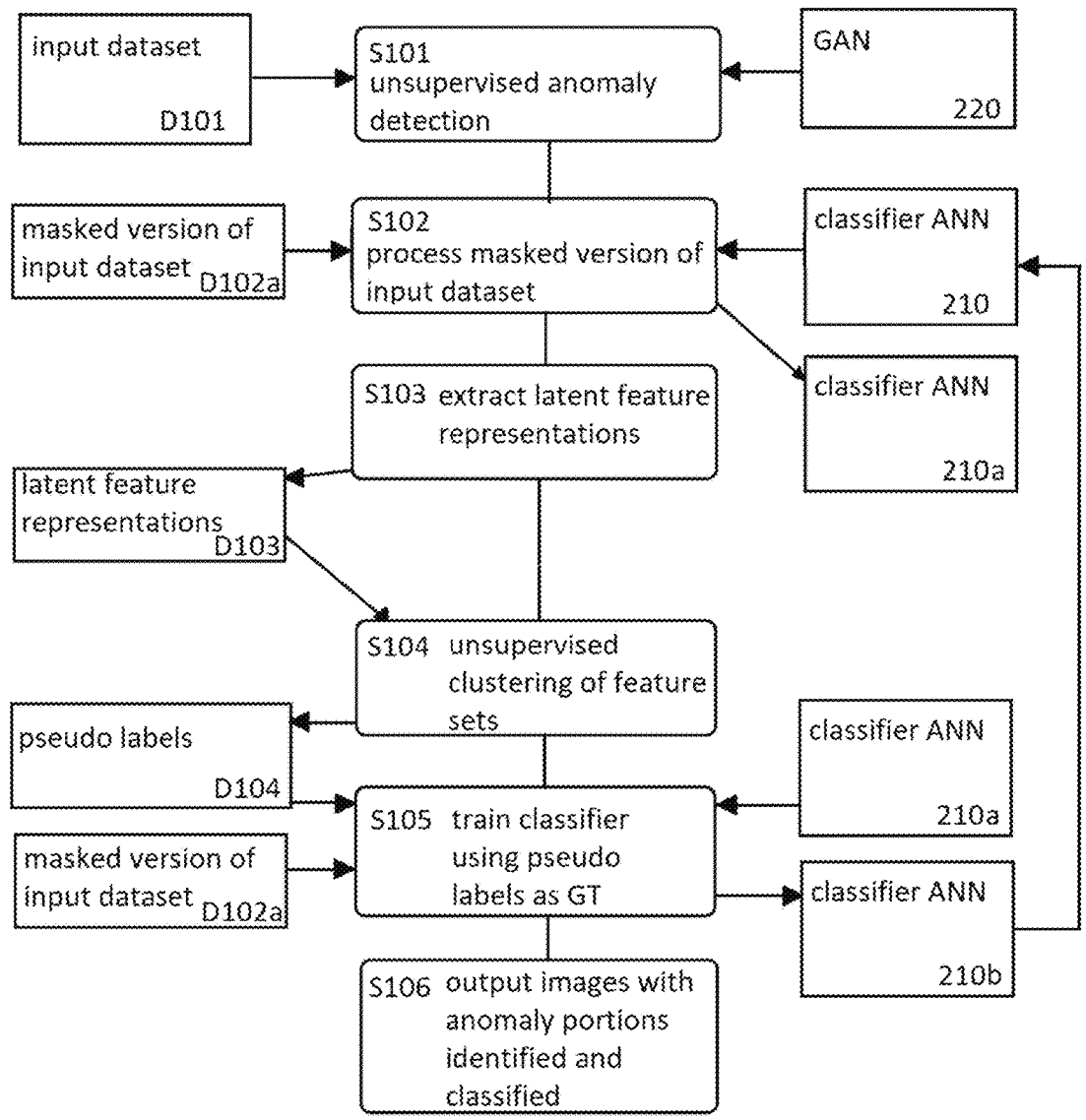
FIG. 3 illustrates a processing flow and interaction with datasets and data artefacts in embodiments.

FIG. 2 illustrates a process of an embodiment. The process may be performed by hardware such as that illustrated in FIG. 1. FIG. 2 illustrates the logic that controls whether training continues or whether the method proceeds to output step S106. The logic is the same in FIG. 3, but is not illustrated in order to simplify the illustration and allow for the datasets and other artefacts to be highlighted. FIG. 3 illustrates the process of FIG. 2 and highlights the datasets and other artefacts (including artificial neural networks) that are processed, produced, or trained, in each step.

At S101 unsupervised anomaly detection is performed on an input dataset D101 comprising a plurality of images of production samples from a production environment. The production samples may be, for example, manufactured products that are manufactured in the production environment. The production samples may be portions of a natural or manufactured material that is either manufactured or in some other way processed (cut, ground, polished, cleaned) in the production environment. Embodiments participate in a quality control mechanism, by identifying location of anomalies on images of production samples, and classifying the identified anomalies into one of plural groups. The process of embodiments is unsupervised, so no human expert labelling of anomalies is required to teach the neural networks.

The unsupervised anomaly detection S101 does leverage a pre-trained autoencoder or generative adversarial neural network 220, in addition to a comparison algorithm. The pre-training (wherein pre-indicates that is a separate process from that illustrated in FIGS. 2 & 3, and performed before the generator neural network 220 is utilised in S101) is achieved by feeding defect-free images (or largely defect-free images) to the generator neural network 220 (which we refer to as the generator neural network 220 to avoid confusion with the classifier neural network 210 introduced later in the process). The training effectively adds noise or artificial defects to the defect-free training images, and teaches a generator neural network 220 (such as an inpainter or autoencoder) to reconstruct the images or image portions so that a discriminator cannot distinguish the reconstruction from the original defect-free training image. More detail on training a generator neural network 220 to perform unsupervised anomaly detection is provided, for example, in EP3739513, or at <URL: https://www.fujitsu.com/global/about/resources/publications/technicalreview/2020-02/article03.html>.

S101 may be performed by any anomaly detection method that can find the anomaly regions in order to generate the mask image per product sample image. Examples include GAN (generative adversarial network) and CNN (convolutional neural network). As a preprocessing step, these networks would need to be trained before being utilised in S101.

Figure 4:
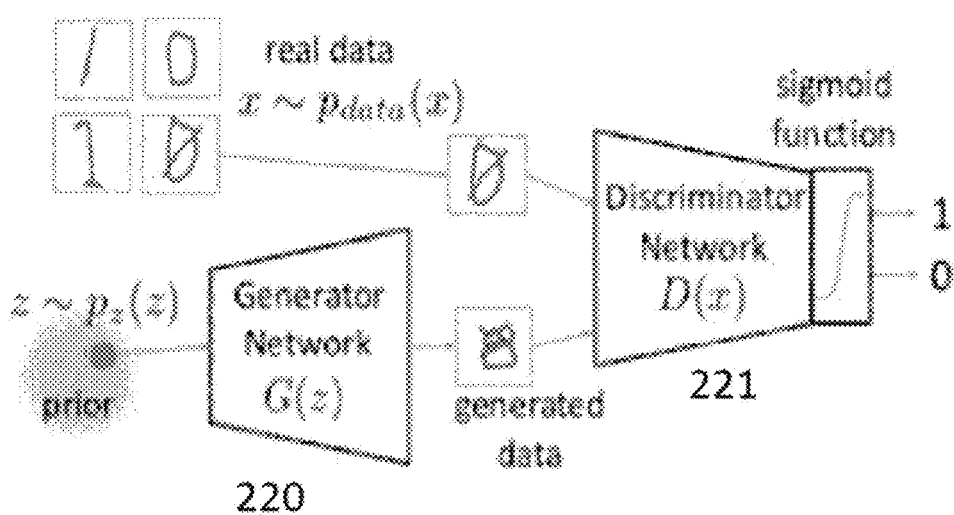
FIG. 4 illustrates a procedure by which a neural network for unsupervised anomaly detection is pre-trained.

FIG. 4 is an example of a generator neural network architecture being trained (i.e. this is the pre-training) to generate defect-free image portions of images of production samples. The generator neural network used in S101 may be, for example, a generative adversarial neural network in which a generator neural network 220 generates data for discrimination from real data by a discriminator neural network 221. The goal of the generator neural network 220 is to generate data that the discriminator neural network 221 fails to discriminate from real data. The output (generator data either is or is not real data) from the discriminator neural network 221 trains the generator neural network 220, for example, by backwards error propagation. The generator neural network 220 is trained to generate data that the discriminator neural network 221 cannot distinguish from real data. The discriminator neural network 221, on the other hand, is also trained, but is trained to discriminate between the generated data and the real data. For example, the discriminator neural network 221 is notified of whether it successfully discriminated between real data and generated data or not, and is trained, for example by backwards error propagation, to successfully discriminate. Therefore, with no human or manual intervention, the generator neural network 220 and the discriminator neural network 221 train one another. There is no requirement for training data to be labelled, therefore removing the requirement for input from a human expert.

In the pre-training, the real data may be images of production samples (such as material surfaces). Optionally, the real data may be images of production samples which, when divided into n regions (for example, in a grid), has higher than a threshold proportion of regions that are defect-free. The threshold proportion may be, for example, 0.99, 0.95, 0.90, or in the range greater than 0.9 less than or equal to 1. For example, the training images may be images of production samples of the same product/material as the images of the input dataset that will be processed in embodiments.

This pre-training step leverages the generative adversarial network technology, such as illustrated in FIG. 2, to learn how to re-generate images of production samples with defects as images of reduced-defect production samples.

At S101, images from the input dataset are processed by the generator neural network 220, which has been trained in the pre-training to remove defects. The produced error, or difference, between the processed version of the image and the original input version of the image (preprocessing notwithstanding), is greater at the location of defects. Therefore, comparison of pixel values (by a comparison algorithm) between two versions of an input image enables defect locations to be identified. For example, a proportion of pixel value difference between equivalent pixels on the two versions may register as an error, and greater than a threshold proportion of errors in a region of a given size may register as a defect. S101 is thus executed by a pre-trained generator neural network 220 in collaboration with a comparison algorithm for performing the comparison of the original input version of the image and the generated version of the image.

In particular, at S101 the processor hardware 100 is configured to perform unsupervised anomaly detection on an input dataset of images of production samples to detect anomaly portions from said images to generate, for each image in the dataset, a corresponding mask image transmitting any detected anomaly portion or anomaly portions in the image and blocking anomaly-free portions.

The output of S101 is a mask for each image of the input dataset D101, which by combination of each image with the corresponding mask produces the masked version of the input dataset D102a (i.e. if the input dataset D101 is imageA, imageB, imageC, etc, the masked version D102a is maskA*imageA; maskB*imageB; maskC*imageC; etc).

For each input raw image in step S101 a corresponding mask image is generated. In step S102 some image processing is performed to combine the two so that raw image A is combined with mask A, raw image B is combined with mask B, etc. When we have 'Raw input image A' from D101 (which includes at least one defect region), we obtain 'Reconstructed image A' in the unsupervised anomaly detection S101, which is 'Raw input image A' from which an anomaly is removed using an unsupervised method. Then, 'Anomaly mask image A' is obtained by comparing 'Raw input image A' with 'Reconstructed image A'. To generate D102a embodiments combine 'Raw input image A' and 'Anomaly mask image A'. And so on, through the entire input dataset D101 to produce D102a.

Raw input image from D101: original image defect region(s) and defect-free regions (i.e. good and not-good pixels).

Mask image provided by S101: anomaly position with black(normal)/white(anomaly) (i.e. block normal pixels, transmit anomaly).

Transformed image (masked version of input image) D102a: only anomaly position of original image.

In embodiments, there is no strict separation of training phase and live phase (the exception being the pre-training of the generator neural network 220 being a distinct process, as discussed above with reference to FIG. 4). The classifier ANN 210 is trained with live data, and in an unsupervised manner. No manual (i.e. expert) input or supervision of the training process is required). The epochs are referred to as training epochs, because the classifier ANN 210 is trained therein, however, the training is on live data, so the training epochs could be referred to simply as epochs. The training epoch is repeated until a training condition is satisfied. For example, the training condition may be a fixed number of epochs, or it may be a degree of convergence of the adjustable weights and biases in the classifier ANN 210 being reached.

Each training epoch includes two, and optionally a third, distinct process, each of which may comprise some adjustment of adjustable weights and biases (i.e. training) of the classifier ANN 210. Each process has its own loss function (cross-entropy in the first and second processes and mutual information in the third process. The training may be by summing the three loss functions (with optional weighting applied to all three) and by adjusting the adjustable weights and biases in the classifier ANN by back error propagation to minimise the sum. The first process comprises steps S101 to S103. The second process comprises steps S104 to S105. Thus, a training epoch comprises steps S102 to S105, which series of steps is repeatable according to a number of training epochs required. Each process is performed once per training epoch. The processes are described as different processes to aid understanding of embodiments, since each process executes some training of the classifier ANN 210, this is indicated by the classifier ANN 210 becoming classifier ANN 210a after the first process, and classifier ANN 210b after the second process. In implementations there may be plural training epochs, so that the classifier ANN 210b from epoch n is the starting classifier ANN 210 at the start of epoch n+1. Likewise in the event of three processes per training epoch, classifier ANN 210c from epoch n is the starting classifier ANN 210 at the start of epoch n+1. The training (i.e. adjustment of adjustable weights and biases to minimise/maximise respective loss functions) may occur per each process, or once per epoch based on a sum of all two/three loss functions.

The training epochs continue until a training condition is met. For example, the condition may be that a predefined count of training epochs is satisfied. Or, the condition may be that the adjustable weights and parameters in the classifier ANN 210 converge to a degree that satisfies a convergence condition. For example, the convergence condition may be a maximum change (according to some summation over all adjustable weights and parameters) in adjustable parameters over a single or a predefined number of training epochs, so that the convergence condition is met when said change is below the maximum change. Of course, more complex metrics such as rolling average may be used to quantify convergence. Similarly, the conditions here are presented as conditions that must be met for training to cease (and the processing continue to step S106), but implementations may use the reverse logic and have a condition that must be met for training to continue.

At S102, the classifier ANN 210 processes the masked version of the input dataset D102a. At S102, a masked version of the input dataset D102a is processed with the classifier ANN 210, the masked version D102 comprising each member of the input dataset D101 masked by the corresponding mask image, and the classifier ANN 210 is trained to classify anomaly portions into one of plural classes by minimising a cross entropy loss function. The classifier ANN 210 classifies the masked images composing the masked version of the input dataset D102a. Some training (i.e. adjustment of adjustable weights and biases in the classifier ANN 210 by back error propagation seeking to minimise a cross entropy loss function) is performed so that the classifier ANN 210 may reduce the loss function in the next epoch. The classifier ANN 210a indicates that some training may have occurred to the classifier 210.

The classifier ANN 210, which may be referred to as a deep neural network, DNN, is trained using cross entropy as a loss function, and back error propagation. The classifier ANN 210 is trained to minimise cross entropy, wherein the ground truth is the images and labels created by transformation of input data. The ground truth is images and labels. This is referred to as unsupervised or self-supervised learning because the ground truth is not type of anomaly, which would need to be information provided by an expert. In a first example, the ground-truth is a self-generated (or automated) label, representing position of anomaly or transform applied to the image. So, for example, the labels could be generated by applying a different label to each version of the same image. This is illustrated in FIG. 9B. First, using both raw and mask image, (A) masked raw image of only anomalous part is made (masked version of input image from input dataset). Then, one or more transformed masked images are made from (A), using different transforms or filters. The non-transformed masked version, and the one or more transformed versions, are all input data to train classifier ANN 210. A different label is allocated to each version. That is, the label is determined by the transform applied to the image, but the mapping of transform to label is arbitrary (so there is no reason why masked raw is "0" and emboss "1", for example, so long as they are different labels). How to label images is just counting them. So, we can make any label to them. e.g. (A)='0', (B)='1', and (C)='2'. Of course, you can use 'A', 'B', and 'C' too. The name of those labels do not have meaning. The label applied to an image depends on the transform (or absence thereof) applied to generate the image. So, you can use any label so long as they are separated.

An exemplary method is creating images by changing colour of the anomalous portion without raw data because this still helps the classifier ANN 210 learn the anomalous part (in this example, each colour would correspond to a different label). However, using raw data helps the classifier ANN 210 to learn the small differences of anomalous features. Additionally, the background colour (normal part) may be changed depending on situation. White is sometimes better rather than black when all anomalies are black colour.

The input (raw) image and corresponding mask may be transformed prior to classification by the classifier ANN 210. Both transformed and non-transformed versions of the masked image may be classified by the classifier ANN 210. In any case, the ground truth is a self-generated (or automated) label that represents the transform (or absence of transform) applied to generate the version of the image, wherein the labels are generated by mapping each different transform (or no transform) to a different label. The labels are said to be "self-generated" or "automated" or "automatically generated" because they are generated by the system/algorithm/process/program/method in the absence of manual/expert input.

Classification1:
Input: Transformed*Raw*Mask
Ground truth: Self-generated (automated) labels
Loss1: cross-entropy The network is trained in order to classify anomalies. However, the purpose is to extract features of anomalies. The defect-free regions (not anomaly) of raw images are almost the same since they are masked. So, the differences are only the anomalous parts. The network (i.e. the classifier ANN 210) learns by looking at only anomalous regions (position) because the network basically looks for the differences to classify them. Since the same neural network is used in the second (and third) processes, the second and third processes are affected by this first process.

The training in step S102 trains the network to produce a feature set that emphasises/extracts/highlights the differences between images (i.e. the anomalies) and ignores the similarities (i.e. the defect-free portions).

The masked version of the input dataset D102a may be transformed prior to processing by the classifier ANN 210 in S102. Any filter/transform may be chosen, the purpose of the transform being to emphasise anomalies, and so the choice being somewhat specific to the production samples being imaged. An exemplary transform/filter is emboss, which emphasises differences in depth and assists the classifier ANN 210 in recognising differences between different types of anomaly. The transformed version may be input instead of or in addition to the non-transformed version. Likewise, more than one transformed version may be input (each with a different transform applied).

The classifier ANN 210 maps an input image or input images to a latent feature representation via a series of operations, some of which are influenced by parameters including weights and biases that are adjustable in a training process. In training, changing the weights and biases changes the mapping of image representation to latent feature representation, which in turn changes the output classification. The classification is a final observable representation, obtained from the latent feature representation.

The latent feature representation of an input image is a feature set that represents the image, and provides a set of features from which the classifier ANN 210 is able to classify the input image. In embodiments, step S103 is a step of extracting latent feature representations of the masked versions of the input images D102a from the classifier ANN 210. The extracting may be achieved in one of two ways. An algorithm may be configured to monitor the classifier ANN 210 as it processes the masked version of the input images D102a, and to extract the latent feature representation of each image during that process (i.e. the classifier ANN 210 is configured to output the latent feature representation of each image and such output is stored, the output and storage being the algorithm). Alternatively, the classifier ANN 210 layers between input and latent feature representation may be isolated and applied to the masked version of the input images D102a (i.e. the masked versions D102a are processed by the classifier ANN 210 but the processing stops before classification, so that the output is the latent feature representation of the respective input image).

The latent feature representations D103 are stored and made accessible to an unsupervised clustering algorithm at S104. The unsupervised clustering algorithm is used for generating a set of pseudo labels corresponding to the masked version of the input dataset by applying the unsupervised clustering algorithm to the latent feature representations to cluster each of the latent feature representations into one of plural clusters each with a different associated pseudo label, to obtain a pseudo label corresponding to each member of the input dataset. Thus, step S104 effectively uses an unsupervised clustering algorithm to map each latent feature representation to a cluster, wherein each cluster is associated with a pseudo label (for example, pseudolabelA, pseudolabelB, pseudolabelC). Since each latent feature representation represents a different member of the masked version of the input dataset D102a, it can be appreciated that each member of the input dataset D101 is associated with a particular pseudo label.

The unsupervised clustering algorithm may be, for example, k-means, but any unsupervised clustering algorithm could be utilised.

Charting the processing of a single input image of a production sample: at S101 it is subjected to unsupervised anomaly detection to obtain a corresponding masked version of the input image. At S102 the masked version is processed by the classifier ANN 210 and at S103 a latent feature representation of the masked version is extracted. At S104 unsupervised clustering of the latent feature representation is performed to map the latent feature representation to a cluster, the cluster corresponding to a pseudo label. And therefore, via steps S101 to S104, each input image is mapped to a pseudo label.

At S105 the classifier ANN 210a is trained to classify the masked version of the input dataset D102a, with the loss function being a loss function to minimise the loss between the classifications output by the classifier ANN 210a and the pseudo labels D104 associated with the corresponding images as ground truth. S105 comprises training the classifier ANN 210a to minimise a loss function between a class into which each member of the masked version of the input dataset D102a is classified by the classifier ANN 210a using the pseudo label for said member as ground truth. That is, the pseudo labels D104 are used as ground truth with which to label the respective masked versions of the input dataset D102a, and the classifications of the masked versions of the input dataset generated by the classifier ANN 210a are compared with the ground truths in a loss function, with training (i.e. adjustment of adjustable weights and parameters in the classifier ANN 210a) performed to minimise the loss function (for example, via back error propagation). Thereby, the classifier ANN 210a is modified to become classifier ANN 210b.

Steps S102 to S105 form a single training epoch, and are performed repeatedly until the training condition is met, as discussed above. The classifier ANN 210b at completion of the training epoch becomes the starting classifier ANN 210 for the next training epoch, as illustrated by the upward arrow between classifier ANN 210b and classifier ANN 210 in FIG. 5.

S106 is a final output step to be performed once the training condition is satisfied. The precise configuration of what data is output, in what format, and to which output destination, is configurable according to implementation requirements. S106 may include outputting, for each member of the input dataset D101, an identification of each detected anomaly portion with a corresponding class into which the anomaly portion is classified by the classifier ANN 210b (specifically by the classifier ANN in a form satisfying the training condition).

Outputting may be by display on a display unit, in audio form via a speaker, by writing to a user interface, by writing to a memory location for access by one or more applications or user interfaces, by transmission to a defined data destination such as a messaging recipient, by transmission to another device in the production environment, or by storage in a defined memory location. The effect is to identify the locations of anomalies on the production samples, and to apply a class label to the anomaly. Applying a class label is useful because a single class label may be applied to plural anomalies across the input dataset D101, and so assigning semantic meaning to a classification is performed once for the plural anomalies (rather than once per anomaly in the absence of classification).

Figure 5:
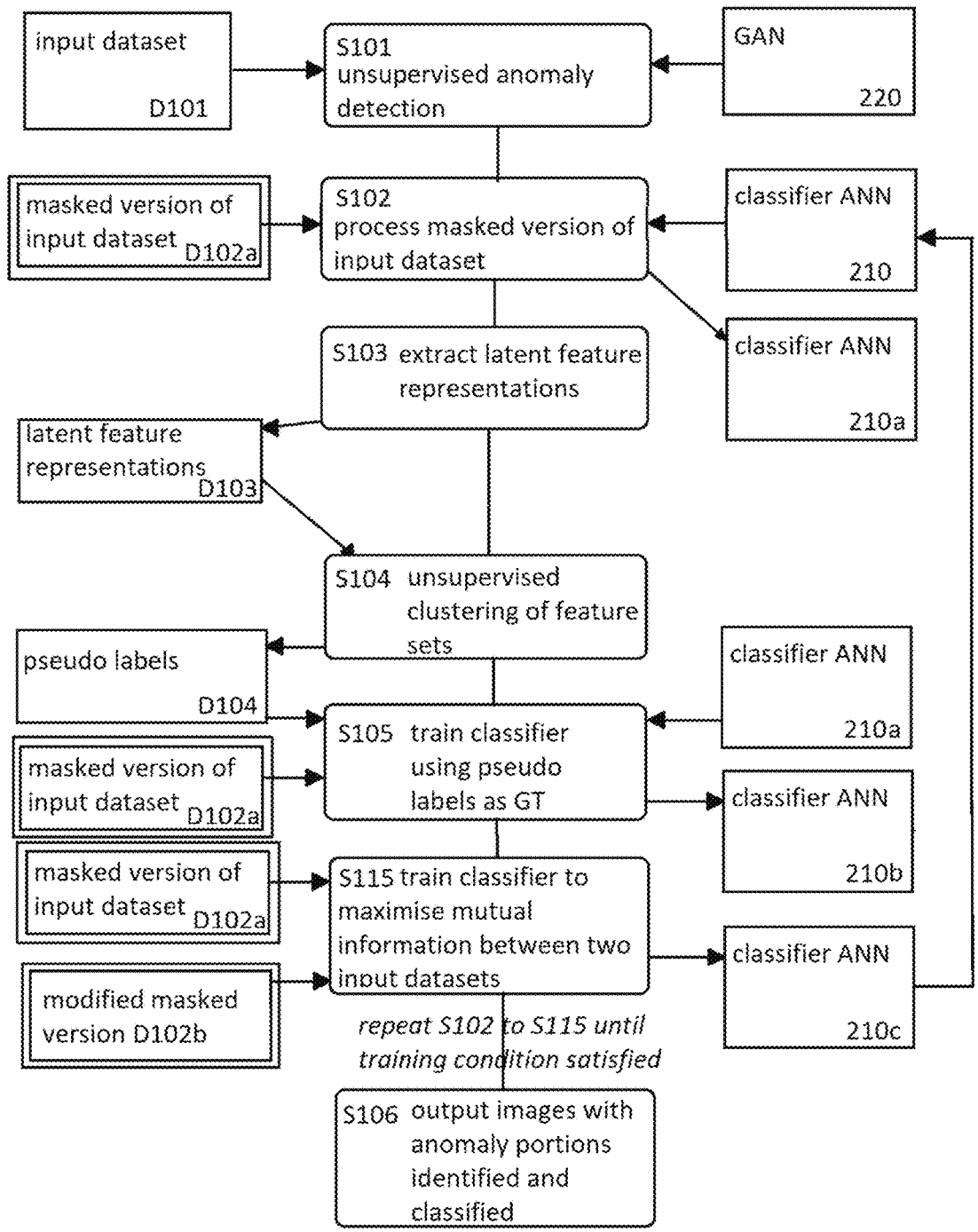
FIG. 5 illustrates a processing flow and interaction with datasets and data artefacts in embodiments.
Figure 6:
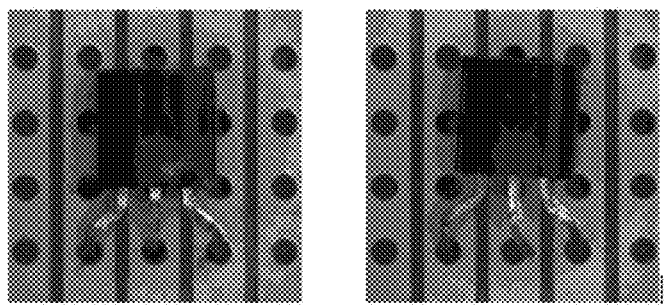
FIG. 6 illustrates images of production samples with and without defects.

FIG. 5 illustrates an embodiment including a third process in each training epoch. For example, the third process may comprise generating S115, as a modified masked input dataset D102a, a modified version of each member of the masked version of the input dataset D102b, by adding noise data to the respective member of the masked version of the input dataset (and optionally also by applying a transform or filter), training the classifier ANN to maximise mutual information as a loss function, based on the classifier ANN processing input dataset A, being the masked version of the input dataset D102a, and the classifier ANN processing input dataset B D102b, being the modified masked version of the input dataset D102b. The third process may be performed first, second, or third, of the three processes per training epoch. It is noted that, whereas the second process is dependent upon data generated by the second process, the third process has no such dependency.

In the third process, the classifier ANN 210 is further trained. This is illustrated in FIG. 5 by the reference sign 210c applied to the classifier ANN 210, to highlight the evolution of the classifier ANN 210 through three training processes per training epoch and as such to be represented as classifier ANN 210a, classifier ANN 210b, and classifier ANN 210c. As described above, the order of the three processes could be modified, so that classifier ANN 210c could actually be generated before classifier ANN 210a, and so classifier ANN 210a could be a modified version of classifier 210c, or vice-versa. The classifier ANN 210c at completion of the training epoch becomes the starting classifier ANN 210 for the next training epoch, as illustrated by the upward arrow between classifier ANN 210c and classifier ANN 210 in FIG. 5.

In an example, the two datasets input to the third process are input datasetA being the masked version of the input dataset D102a, i.e. raw image× mask; and input dataset B being raw image×mask×affine (i.e. a transform)+noise. The transform may be, for example, an emboss image processing transform.

In the order illustrated in FIG. 5, the classifier ANN 210b is used to perform the third process, and said classifier ANN 210b is trained during the third process to produce classifier ANN 210c. The training includes, for example, adjusting adjustable weights and biases in the classifier ANN 210b by back error propagation from maximisation of a loss function which in the present example is mutual information.

Mutual information loss leverages invariant information clustering (IIC), see<URL: https://arxiv.org/pdf/1807.06653.pdf>. Input datasets are input datasetA being the masked version of the input dataset D102a, i.e. raw image× mask; and input dataset B being raw image× mask× affine (i.e. a transform)+noise. No ground truth is required in this process because IIC is an unsupervised technique. Using both input datasets A and B, mutual information is calculated as the loss function, which training seeks to maximize. This contrasts with the second process, which uses cross entropy as the loss function and thus requires ground truths (which ground truths are provided in the form of the pseudo labels from S104). The training method in the second process may be, for example, DeepCluster such as described at <URL: https://arxiv.org/pdf/1807.05520.pdf>.

Process 3: to calculate Mutual information loss: Input both A:(raw×mask×(filter)) and B:(raw×mask×(filter))×affine (any transform)+noise). It doesn't use pseudo labels from unsupervised clustering.

Input: A, B
Output: P(A), P(B)
Loss: l(P(A), P(B)): mutual information

Process 2: to calculate Cross-entropy loss: Input is only A:(raw×mask×(filter)), but the pseudo labels which are given by unsupervised clustering, are used as the ground-truth.

Input: A
Feature set: f(A)
Pseudo label: Q(f(A))
Loss: L(A_label, Q(f(A))): cross entropy The noise may be, for example, noisy data such as random or pseudo random pixels or black pixels (or groups of pixels such as shapes) added to the image data. The classifier ANN 210 is learning to classify properly in the event of imperfect image data, or images of anomalies that are incomplete or otherwise deviate from other images of similarly classified anomalies.

Following completion of the training in S115, the classifier ANN 210c is assessed to determine whether the training condition is met, as described above in relation to S105 of FIG. 3.

In FIG. 5, double boxes are applied to datasets to which transforms or filters may be applied as a preprocessing step before the dataset in question is processed by the classifier ANN. The transforms or filters to apply to each dataset are either predetermined (i.e. fixed) parameters, or may be determined as a parameter to apply to the entire method. It may be that certain filters or transforms are better suited to different production sample types, so it may be that, for example, speed of training and/or accuracy of classification and/or accuracy of anomaly detection are enhanced by selection of a suitable filter or transform. The double boxes are illustrated in FIG. 5, but apply equally to the equivalent datasets in the other Figures, for example, FIG. 3.

Figure 7:
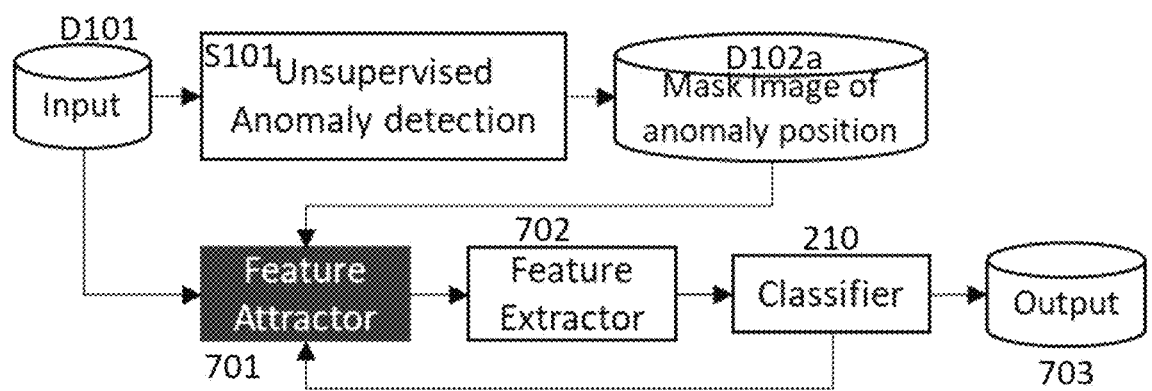
FIG. 7 illustrates a flow of processing in embodiments.

FIG. 7 is an alternative representation of the embodiments of, for example, FIGS. 2, 3, and 5. It is the nature of computer-implemented technology that different schematics and diagrams illustrate the same procedure and aid understanding by emphasising different features. Embodiments simultaneously train and test a classifier ANN 210 to classify sorts of anomalies, so training phase and testing phase are not divided. That is, the input dataset D101 which is used to train the classifier ANN 210 is a dataset of live images from the production environment. Input dataset D101 is images including various types of anomalies. The unsupervised anomaly detection S101 is the pre-trained aspect of the system, as described above, and which can segment anomaly positions from input images. Then, the masked images D102a of pixel-wise OK/NG (good, or not good) are obtained. The feature attractor 701 and feature extractor 702 perform the step S103 of extracting latent feature representations of the masked versions of the input images D102a from the classifier ANN 210, which features are used to generate pseudo labels in S104 and thus to train the classifier ANN 210 in step S105. As the output 703, the feature map of anomalies per input image and classified anomaly types are obtained.

Figure 8:
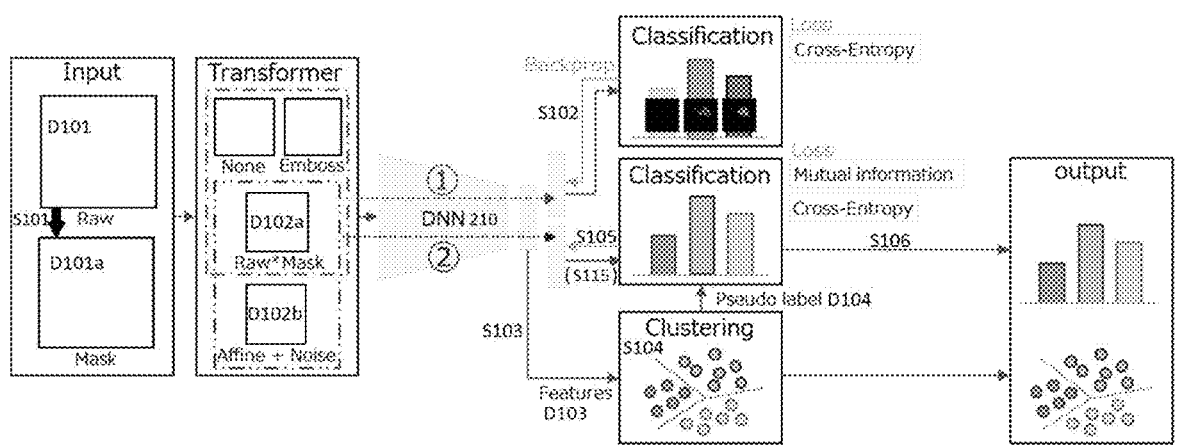
FIG. 8 illustrates a flow of processing in embodiments.

FIG. 8 is an alternative representation of the embodiments of, for example, FIGS. 2, 3, 5 and 7. FIG. 8 illustrates the input dataset D101 (raw images) being processed by a pre-trained neural network to obtain corresponding masks D101a which indicate locations of defects on corresponding input images. The input dataset D101 and corresponding masks D101a are combined to produce the masked versions of the input dataset D102a. The transformer is effectively an image processor which combines versions of images, and optionally applies transforms such as emboss, before input to the classifier ANN 210, which in this example is a deep neural network or DNN.

Process 1 is indicated by the 1 reference sign and is classification of only anomaly position to train DNN 210 to look at the part of images that contain anomalies. The input data is filtered raw images such as emboss. The classifier ANN 210, which may be referred to as a deep neural network, DNN, is trained at S102 using cross entropy as a loss function, and back error propagation. The input (raw) image in S102 and corresponding mask may be transformed prior to classification by the classifier ANN 210. Both transformed and non-transformed versions of the masked image may be classified by the classifier ANN 210. In any case, the ground truth is a self-generated (automated) label that represents the transform (or absence of transform) applied to generate the version of the image, wherein the labels are generated by mapping each different transform (or no transform) to a different label. The labels are said to be "self-generated" or "automated" or "automatically generated" because they are generated by the system/algorithm/process/program/method in the absence of manual/expert input. The classifier ANN 210 is trained to minimise cross entropy, in other words, to achieve a classification that is as close as possible to the ground truth. The input is either the masked versions of the input dataset D102a or transformed or filtered (eg embossed) versions thereof (or both the non-transformed and transformed versions).

Process 2 is indicated by the reference sign 2, but it is noted that the third process is also depicted in FIG. 8. At S103 the feature sets are extracted to obtain the latent feature representations D103 of the masked versions D102a. At S104 unsupervised clustering of the latent feature representations D103 is performed to map the latent feature representations D103 to a cluster, the cluster corresponding to a pseudo label D104. At S105 the DNN 210 is trained to classify the anomalies into groups using the pseudo labels D104 as ground truths with cross-entropy as a loss function, based on DeepCluster.

In the third process S115 classification by the DNN 210 is performed including maximizing mutual information between masked versions D102a and further modified versions thereof D102b (by addition of noise) can avoid to predict a single class with certainty due to the entropy minimization and issue with noisy data. The third process leverages invariant information clustering.

S106 is the output step, as detailed above, in which the input images are output with their respective anomaly positions detected and classifications applied to the detected anomalies.

Figure 9A:
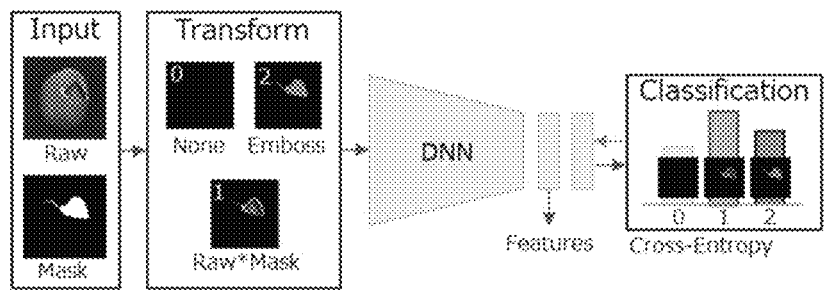
FIG. 9A illustrates the first process in more detail.
Figure 9B:
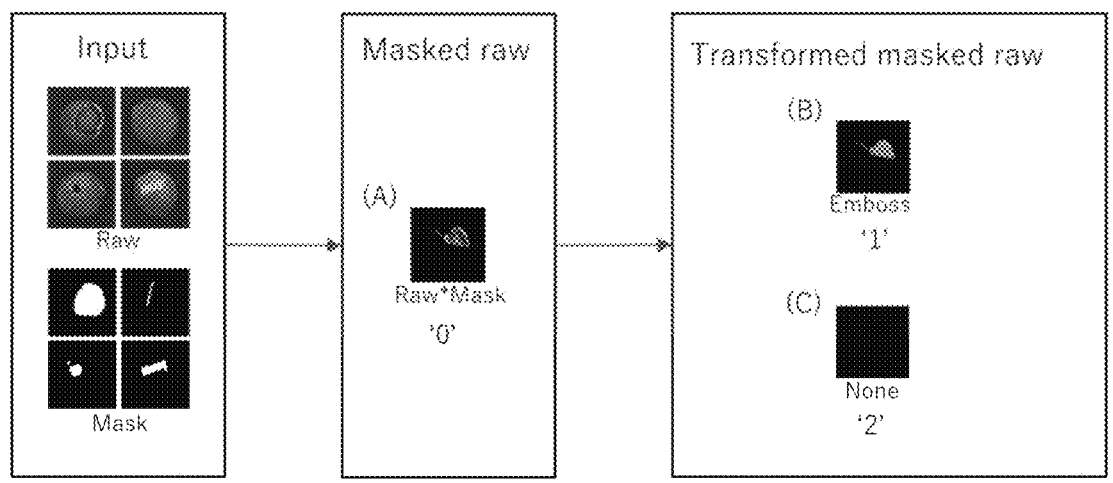
FIG. 9B illustrates the procedure for automatically generating labels in more detail.

FIG. 9A shows the first process from FIG. 8 in more detail. Raw and mask images of anomaly position are used as the input data. They are transformed with some filters after masked raw image. In case of the figure, non-filtered, emboss, and raw are used as the input data for DNN. DNN classify these labels with the cross entropy. Hence, the network can be one which can look at only anomaly because the other area is same features FIG. 9A shows the process to calculate Loss1 (i.e. the cross-entropy loss in the first process). It requires transformed raw data (raw*mask) as the input, and their labels (0, 1, 2 on FIG. 9A). The labels are the ground truth, and are self-generated labels that represent the transform (or absence of transform) applied to generate the version of the image (as illustrated in FIG. 9B), wherein the labels are generated by mapping each different transform (or no transform) to a different label. The labels are said to be "self-generated" or "automated" or "automatically generated" because they are generated by the system/algorithm/process/program/method in the absence of manual/expert input. The input (raw) image and corresponding mask may be transformed prior to classification by the classifier ANN 210. Both transformed and non-transformed versions of the masked image may be classified by the classifier ANN 210. The process of generating plural versions of an input image and labelling those versions in preparation for processing by the classifier ANN 210 is repeated for each image in the input dataset.

An implementation of an embodiment is now described.

In the implementation, the MVTec AD dataset, which has 15 different categories split into textures and objects from real-world applications, is used. In a preprocessing stage the images are resized and normalised to 256×256 pixels. The dataset has a corresponding ground-truth dataset for anomaly position as the mask images. This implementation is applied with these ground-truth mask images as the input data to evaluate this technology.

Training and testing is implemented in PyTorch. A batch size of 16 images is used for testing the network. The model is optimised using the SGD optimiser with learning rate=1× $10^{-3}$, momentum=0.9, weight decay=0 and dampening=nesterov=False.

Figure 10:
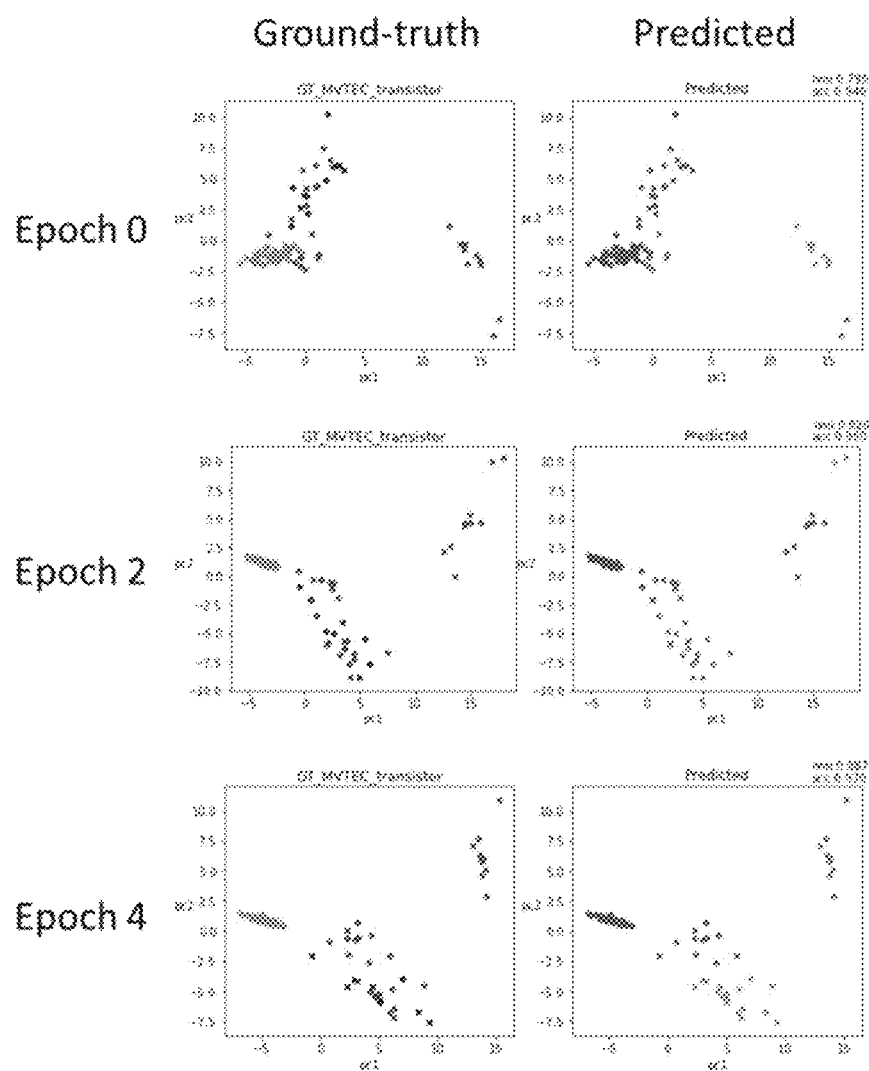
FIG. 10 illustrates progression of feature map with training epochs in an implementation.

FIG. 10 illustrates the results of each epoch by this technology. They are extracted feature maps calculated by PCA of two dimension from network and are clustered by k-means. The label colours of the left graph are ground-truth, and the ones of the right graph are the prediction. The purpose of the implementation is to separate the groups with distance on the feature map. Epoch 0 is an example with non-trained network. With no training, there are roughly two groups. Once the network is trained, these groups have distance from other groups. For the timing to finish training, silhouette coefficient, pseudo F, and davies bouldin Index can be used as metrics.

Figure 11:
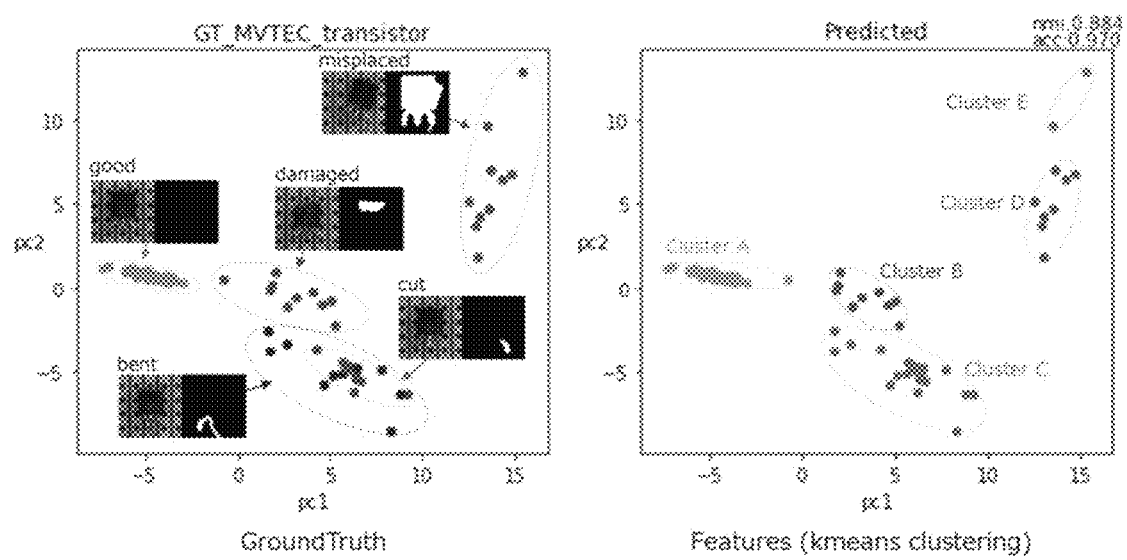
FIG. 11 illustrates a feature map in an implementation with transistor image dataset.
Figure 13:
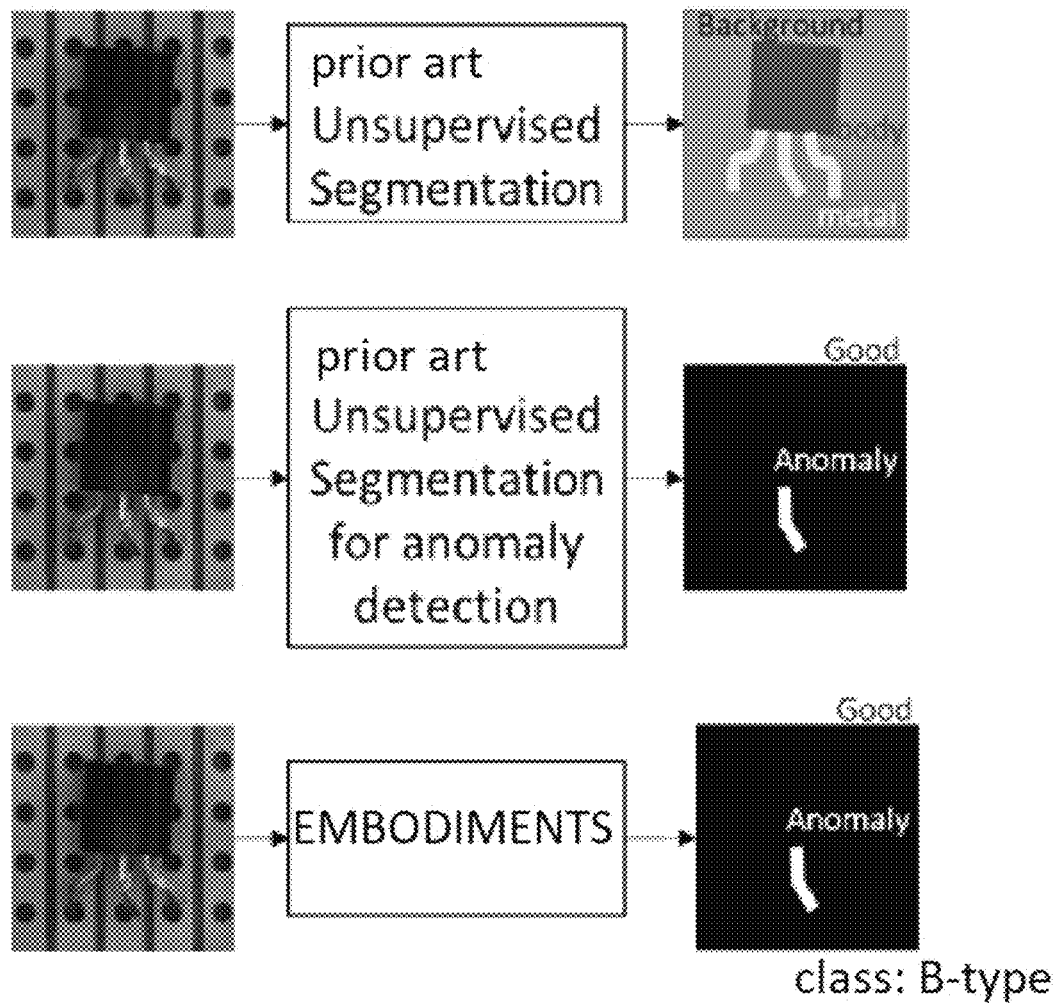
FIG. 13 compares embodiments with prior art algorithms.
Figure 14:
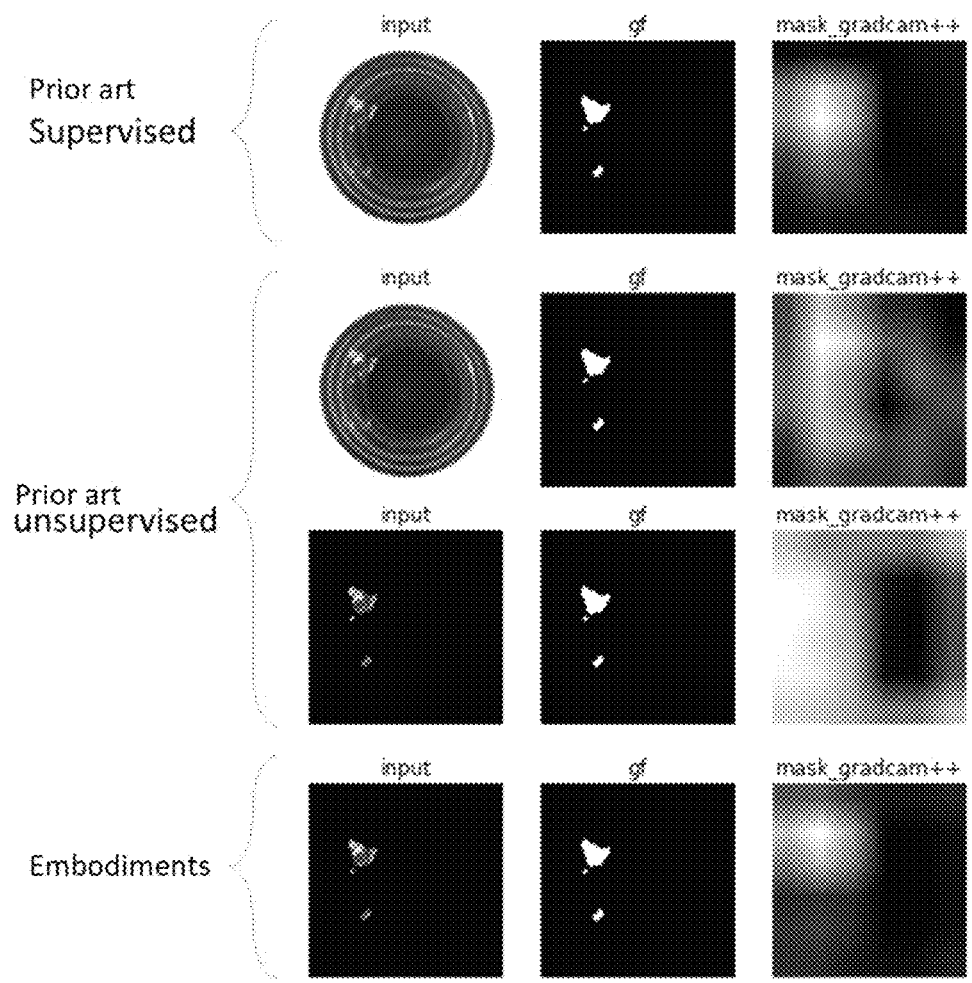
FIG. 14 compares embodiments with prior art algorithms.

FIG. 11 shows the best result for transistors as the production samples. The left feature map is shown with sample pictures. In this case, there are four classes of anomalies and good (no anomaly). The predicted clustering is shown in the right graph.

FIG. 12 shows the numeric results with 15 MVTec datasets as the benchmarking inputs against existing methods, which are PCA & unsupervised clustering, transfer learning, and Deep Cluster <URL: https://arxiv.org/pdf/1807.05520.pdf>. The numeric value is normalized mutual information which is popular widely to evaluate unsupervised clustering in this research. For all datasets, this technology outperforms existing methods.

Figure 15:
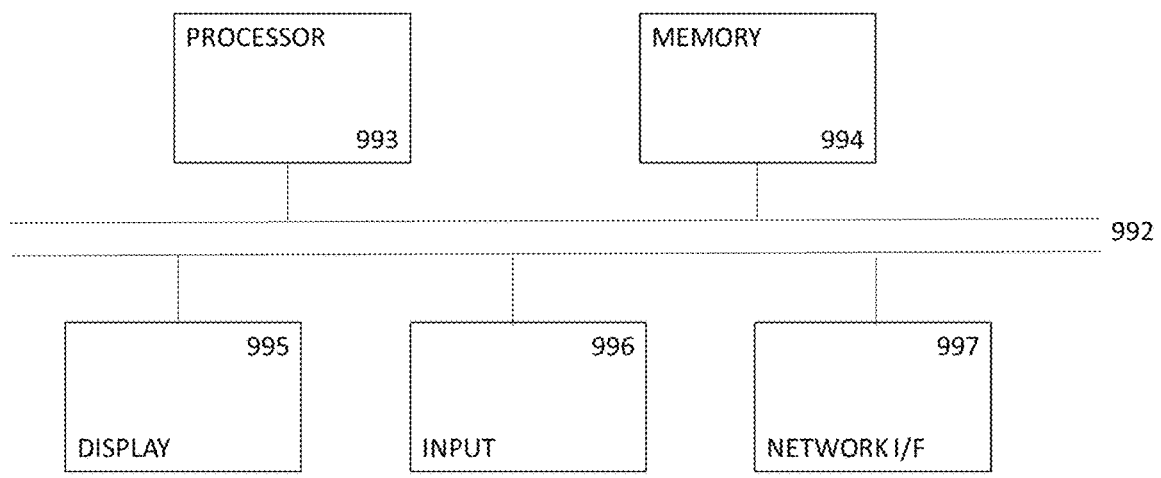

FIG. 15 is a block diagram of a computing device, such as a computing apparatus or server, which embodies the present invention, and which may be used to implement a computing apparatus configured to identify and classify anomalies in images of production samples, such as illustrated in FIG. 1 and for performing the actions illustrated in FIGS. 2 to 5, and 7 to 9, in particular. The computing device comprises a processor 993, and memory, 994. Optionally, the computing device also includes a network interface 997 for communication with other computing devices, for example with other computing devices of invention embodiments.

For example, an embodiment may be composed of a network of such computing devices. Optionally, the computing device also includes one or more input mechanisms such as keyboard and mouse 996, and a display unit such as one or more monitors 995. The components are connectable to one another via a bus 992. The computing device may include or be in data communication with an imaging device, such as a camera, for acquiring images of production samples.

The memory 994 may include a computer readable medium, which term may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing code stored in the memory to implement the various different steps of FIGS. 1, 2, 3, 5, & 6 described here and in the claims. The processor 993 may include a GPU (graphics processing unit) adapted to implement one or more neural networks, such as the generator neural network 340. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The display unit 997 may display a representation of data stored by the computing device and may also display a cursor and dialog boxes and screens enabling interaction between a user and the programs and data stored on the computing device. The input mechanisms 996 may enable a user to input data and instructions to the computing device.

The network interface (network I/F) 997 may be connected to a network, such as the Internet, and is connectable to other such computing devices via the network. The network I/F 997 may control data input/output from/to other apparatus via the network. Other peripheral devices such as microphone, speakers, printer, power supply unit, fan, case, scanner, trackerball etc may be included in the computing device.

Methods embodying the present invention may be carried out on a computing device such as that illustrated in FIG. 15. Such a computing device need not have every component illustrated in FIG. 15, and may be composed of a subset of those components. A method embodying the present invention may be carried out by a single computing device in communication with one or more data storage servers via a network. The computing device may be a data storage itself storing the classifier ANN 210, and the output of S106.

A method embodying the present invention may be carried out by a plurality of computing devices operating in cooperation with one another. One or more of the plurality of computing devices may be a data storage server storing at least a portion of the classifier ANN 210, and the output identification and classification of anomalies from S106.

The invention claimed is:

1. A computing apparatus configured to identify and classify anomalies in images, the computing apparatus comprising memory hardware and processor hardware, the memory hardware storing a classifier artificial neural network (a classifier ANN) and processing instructions, the processor hardware being configured to execute the processing instructions which, when executed, cause the computing apparatus to:

perform unsupervised anomaly detection on an input dataset of images to detect anomaly portions from said images to generate, for an image in the input dataset, a corresponding mask image that transmits a detected anomaly portion in the image and blocks an anomaly-free portion in the image;

train the classifier ANN, including, in each training epoch of training epochs:
in a first process:
processing masked versions of the images in the input dataset with the classifier ANN, a masked version of the masked versions comprising the image in the input dataset masked by the corresponding mask image that transmits the detected anomaly portion in the image and blocks the anomaly-free portion in the image, and training the classifier ANN to classify the detected anomaly portion of the image in the input dataset into one of plural classes by minimising a cross entropy loss function using automatically generated labels as ground truths;
extracting, from the classifier ANN, latent feature representations respectively corresponding to the masked versions of the images in the input dataset;
in a second process:
generating a set of pseudo labels corresponding to the masked versions of the images in the input dataset by applying an unsupervised clustering algorithm to corresponding latent feature representations to cluster a latent feature representation, among the corresponding latent feature representations, into one of plural clusters, each cluster of the plural clusters with a different associated pseudo label, to obtain pseudo labels respectively corresponding to the images in the input dataset;
training the classifier ANN to minimise a loss function between the plural classes into which the masked versions of the images in the input dataset are respectively classified by the classifier ANN using the pseudo labels for the images in the input dataset as ground truth;
the computing apparatus being caused to execute each training of the training epochs repeatedly until satisfaction of a training condition, and to output, for the image in the input dataset, an identification of the detected anomaly portion with a corresponding class among the plural classes into which the detected anomaly portion is classified by the classifier ANN.

2. The computing apparatus according to claim 1, wherein the masked version of the image in the input dataset processed by the classifier ANN in the first process, in addition to being masked by the corresponding mask image, is filtered by an image filter or transformed by an image transform algorithm.

3. The computing apparatus according to claim 2, wherein the image filter is an emboss image filter or the image transform algorithm is an embossing image transform algorithm.

4. The computing apparatus according to claim 2, wherein the masked version of the image in the input dataset comprises plural versions of the image in the input dataset, the plural versions being the image filtered with a selection of a filter among filters including plural image transform algorithm or image filters applied.

5. The computing apparatus according to claim 4, wherein the automatically generated labels are determined by the image transform algorithm or an image filter applied to a version, among the plural versions, so that the image transform algorithm or the image filter maps to a label among label values, the label values being arbitrary values different from one another.

6. The computing apparatus according to claim 1, wherein the unsupervised anomaly detection is performed with an autoencoder or a generator neural network, pre-trained to generate defect-free portions of images, and to generate a mask image corresponding to an image in the input dataset by generating a defect-free version of the image, and comparing the image with the defect-free version of the image to obtain the mask image.

7. The computing apparatus according to claim 6, wherein the generator neural network is a generative adversarial neural network.

8. The computing apparatus according to claim 1, wherein the loss function in the first process is a pixel-wise cross entropy loss.

9. The computing apparatus according to claim 1, wherein each training epoch of the training epochs further includes:
in a third process:
generating, as a modified masked input dataset, a modified version of each image of the masked versions of the input dataset, by adding noise data to each image of the masked versions of the input dataset and by applying a transform or filter,
further training the classifier ANN to maximise mutual information as a loss function, based on the classifier ANN processing an input dataset A, being a masked input dataset, and the classifier ANN processing an input dataset B, being the modified masked input dataset.

10. A system, comprising the computing apparatus according to claim 1, and imaging apparatus configured to generate the images and to store the images as the input dataset for processing by the computing apparatus.

11. The system according to claim 10, wherein the images are images of production samples, and further comprising a production environment for producing products or materials as production samples.

12. A method of identifying and classifying anomalies in images, the method comprising:
performing unsupervised anomaly detection on an input dataset of images to detect anomaly portions from said images to generate, for an image in the input dataset, a corresponding mask image that transmits a detected anomaly portion in the image and blocks an anomaly-free portion in the image;
training a classifier artificial neural network (a classifier ANN) including,
in each training epoch of training epochs:
in a first process:
processing masked versions of the images in the input dataset with the classifier ANN, a masked version of the masked versions comprising the image in the input dataset masked by a corresponding mask image that transmits the detected anomaly portion in the image and blocks the anomaly-free portion in the image, and training the classifier ANN to classify the detected anomaly portion of the image in the input dataset into one of plural classes by minimising a cross entropy loss function using automatically generated labels as ground truths;
extracting, from the classifier ANN, latent feature representations respectively corresponding to the masked versions of the images in the input dataset;
in a second process:
generating a set of pseudo labels corresponding to the masked versions of the images in the input dataset by applying an unsupervised clustering algorithm to corresponding latent feature representations to cluster a latent feature representation, among the corresponding latent feature representations, into one of plural clusters, each cluster of the plural clusters with a different associated pseudo label, to obtain pseudo labels respectively corresponding to the images in the input dataset;

training the classifier ANN to minimise a loss function between the plural classes into which the masked versions of the images in the input dataset are respectively classified by the classifier ANN using the pseudo labels for the images in the input dataset as ground truth;

the method comprising executing each training of the training epochs repeatedly until satisfaction of a training condition, and outputting, for the image in the input dataset, an identification of the detected anomaly portion with a corresponding class among the plural classes into which the detected anomaly portion is classified by the classifier ANN.

13. The method according to claim 12, wherein the masked version of the image in the input dataset processed by the classifier ANN in the first process, in addition to being masked by the corresponding mask image, is filtered by an image filter or transformed by an image transform algorithm.

14. The method according to claim 13, wherein the image filter is an emboss image filter or the image transform algorithm is an embossing image transform algorithm.

15. The method according to claim 13, wherein the masked version of the image in the input dataset comprises plural versions of the image in the input dataset, the plural versions being the image filtered with a selection of a filter among filters including plural image transform algorithm or image filters applied.

16. The method according to claim 15, wherein the automatically generated labels are determined by the image transform algorithm or an image filter applied to a version, among the plural versions, so that the image transform algorithm or the image filter maps to a label among label values, the label values being arbitrary values different from one another.

17. The method according to claim 12, wherein the unsupervised anomaly detection is performed with an autoencoder or a generator neural network, pre-trained to generate defect-free portions of images, and to generate a mask image corresponding to an image in the input dataset by generating a defect-free version of the image, and comparing the image with the defect-free version of the image to obtain the mask image.

18. The method according to claim 17, wherein the generator neural network is a generative adversarial neural network.

19. The method according to claim 12, wherein each training epoch of the training epochs further includes:
in a third process:
generating, as a modified masked input dataset, a modified version of each image of the masked versions of the input dataset, by adding noise data to each image of the masked versions of the input dataset and by applying a transform or filter,
further training the classifier ANN to maximise mutual information as a loss function, based on the classifier ANN processing an input dataset A, being a masked input dataset, and the classifier ANN processing an input dataset B, being the modified masked input dataset.

20. A non-transitory computer-readable storage medium storing a computer program which, when executed by a computing apparatus having processor hardware and memory hardware, causes the computing apparatus to perform a method of identifying and classifying anomalies in images, the method comprising:

performing unsupervised anomaly detection on an input dataset of images to detect anomaly portions from said images to generate, for an image in the input dataset, a corresponding mask image that transmits a detected anomaly portion in the image and blocks an anomaly-free portion in the image;

training a classifier artificial neural network (a classifier ANN), including, in each training epoch of training epochs:

in a first process:
processing masked versions of the images in the input dataset with the classifier ANN, a masked version of the masked versions comprising the image in the input dataset masked by the corresponding mask image that transmits the detected anomaly portion in the image and blocks the anomaly-free portion in the image, and training the classifier ANN to classify the detected anomaly portion of the image in the input dataset into one of plural classes by minimising a cross entropy loss function using automatically generated labels as ground truths;

extracting, from the classifier ANN, latent feature representations respectively corresponding to the masked versions of the images in the input dataset;

in a second process:
generating a set of pseudo labels corresponding to the masked versions of the images in the input dataset by applying an unsupervised clustering algorithm to the corresponding latent feature representations to cluster a latent feature representation, among the corresponding latent feature representations, into one of plural clusters, each cluster of the plural clusters with a different associated pseudo label, to obtain pseudo labels respectively corresponding to the images in the input dataset;

training the classifier ANN to minimise a loss function between the plural classes into which the masked versions of the images in the input dataset are respectively classified by the classifier ANN using the pseudo labels for the images in the input dataset as ground truth;

the method comprising executing each training of the training epochs repeatedly until satisfaction of a training condition, and outputting, for the image in the input dataset, an identification of the detected anomaly portion with a corresponding class among the plural classes into which the detected anomaly portion is classified by the classifier ANN.

* * * * *